US009799099B2

(12) United States Patent
Yang (10) Patent No.: US 9,799,099 B2
(45) Date of Patent: Oct. 24, 2017

(54) SYSTEMS AND METHODS FOR AUTOMATIC IMAGE EDITING

(71) Applicant: Cyberlink Corp., Shindian, Taipei (TW)

(72) Inventor: Wei-Sheng Yang, New Taipei (TW)

(73) Assignee: CYBERLINK CORP., Shindian, Taipei (TW)

( * ) Notice: Subject to any disclaimer, the term of this patent is extended or adjusted under 35 U.S.C. 154(b) by 227 days.

(21) Appl. No.: 13/774,121

(22) Filed: Feb. 22, 2013

(65) Prior Publication Data
US 2014/0241592 A1 Aug. 28, 2014

(51) Int. Cl.
*G06K 9/00* (2006.01)
*G06T 5/00* (2006.01)

(52) U.S. Cl.
CPC .......... *G06T 5/001* (2013.01); *G06K 9/00221* (2013.01); *G06T 2207/20081* (2013.01)

(58) Field of Classification Search
None
See application file for complete search history.

(56) References Cited

U.S. PATENT DOCUMENTS

| 6,701,011 B1 * | 3/2004 | Nakajima | 382/167 |
| 7,558,408 B1 * | 7/2009 | Steinberg et al. | 382/118 |
| 2002/0015514 A1 * | 2/2002 | Kinjo | 382/118 |
| 2006/0280427 A1 | 12/2006 | Snowdon et al. | |
| 2007/0071317 A1 * | 3/2007 | Kubo et al. | 382/167 |
| 2007/0110305 A1 * | 5/2007 | Corcoran et al. | 382/167 |
| 2007/0294305 A1 * | 12/2007 | Cohen et al. | 707/104.1 |
| 2008/0106764 A1 * | 5/2008 | Fujino | 358/2.1 |
| 2010/0158357 A1 * | 6/2010 | Hung et al. | 382/162 |
| 2010/0245862 A1 * | 9/2010 | Noguchi | G09B 21/008 358/1.9 |

OTHER PUBLICATIONS

Yager, Ronald R. "On ordered weighted averaging aggregation operators in multicriteria decisionmaking." IEEE Transactions on systems, Man, and Cybernetics 18.1 (1988): 183-190.*
Vladimir Bychkovsky et al. "Learning Photographic Global Tonal Adjustment with a Database of Input/Output Image Pairs" Jun. 17, 2011.

* cited by examiner

*Primary Examiner* — Sean Conner
(74) *Attorney, Agent, or Firm* — McClure, Qualey & Rodack, LLP (57) ABSTRACT

Various embodiments are disclosed for automatic image editing. One embodiment is a method for editing an image in an image editing device that comprises obtaining the image and analyzing attributes of the image, wherein the attributes correspond to facial attributes of at least one individual shown in the image. The method further comprises retrieving from a database a modification previously obtained by the image editing device, wherein retrieving the modification is performed based on the analyzed attributes of the image. The retrieved modification is applied to the image based on the attributes of the image.

30 Claims, 10 Drawing Sheets

SYSTEMS AND METHODS FOR AUTOMATIC IMAGE EDITING

BACKGROUND

Over the years, digital content has gained increasing popularity with consumers. With the ever-growing amount of digital content available to consumers through the Internet and other sources, consumers have access to a vast amount of content. Furthermore, many mobile devices allow consumers to capture digital images. With the widespread use of digital cameras, many individuals turn to image management tools to archive and organize their digital photographs. While many image management tools are readily available, the overall image editing process can still be tedious and time-consuming when processing a large volume of images.

SUMMARY

Briefly described, one embodiment, among others, is a method for editing an image in an image editing device that comprises obtaining the image and analyzing attributes of the image, wherein the attributes correspond to facial attributes of at least one individual shown in the image. The method further comprises retrieving from a database a modification previously obtained by the image editing device, wherein retrieving the modification is performed based on the analyzed attributes of the image. The retrieved modification is applied to the image based on the attributes of the image.

Another embodiment is a system for editing images. The system comprises a media interface configured to obtain an image and a facial recognition analyzer configured to whether the image comprises an individual, wherein the facial recognition analyzer is further configured to identify the individual in the image. The system further comprises an effects applicator configured to retrieve a previously obtained modification from a database, wherein the effects applicator retrieves the modification based on the identified individual in the image. The system further comprises an attributes analyzer configured to determine whether to apply the retrieved modification to the image based on attributes of the image, wherein the effects applicator is configured to apply the retrieved modification to the image based on the determination by the attribute analyzer.

Another embodiment is a non-transitory computer-readable medium embodying a program executable in a computing device, comprising code that obtains an image and identifies an individual in the image and code that retrieves from a database a previously obtained modification, wherein the code that retrieves is configured to retrieve the modification based on the facial recognition performed on the image. The program further comprises code that determines whether to apply the retrieved modification to the image based on attributes of the image and code that applies the retrieved modification based on the determination.

Another embodiment is a method for editing an image in an image editing device that comprises obtaining a plurality of modifications for a plurality of images depicting a same individual, storing each of the modifications and associating each of the modifications with the same individual depicted in each of the images, and obtaining a new image depicting the same individual. The method further comprises retrieving from the database one of the stored modifications based on the association with the same individual and applying the retrieved modification to the new image based on at least one attribute of the new image.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 4-6A and 6B illustrate the operation of various components of the image editing system of FIG. 1A in accordance with various embodiments of the present disclosure.

DETAILED DESCRIPTION

One perceived shortcoming with conventional image editing applications is the degree of time involved in the selection of images for editing purposes. With many applications, users typically manually identify individuals within digital images and apply a particular modification or editing operation on the digital image. While some image editing applications perform facial detection, the editing process can still be time-consuming, particularly when trying to organize and search through a large volume of photos. In many cases, an individual may wish to apply the same editing operation to all digital images depicting that individual.

With the widespread availability of digital cameras, individuals are able to take photos anytime and anywhere. As it is common for individuals to take photos on the fly, however, photos are many times taken under less than optimal lighting conditions, thereby resulting in digital images where individuals within the images may be somewhat obscured due to poor lighting, poor contrast levels, and so on. While image editing applications allow individuals to touch up images, retouching photos one by one is time consuming. Furthermore, the editing preferences of an individual may change over time.

Various embodiments are described for reducing the time and effort consumed in editing digital images. Note that while various systems and methods are described in the context of photos depicting individuals, it should be emphasized that the techniques may also be applied to objects and/or landscapes. One embodiment, among others, is directed to a method for editing an image in an image editing device that comprises obtaining the image and analyzing attributes of the image. A modification is retrieved from a database where the modification was previously obtained by the image editing device. Retrieval of the modification from the database is performed based on the analyzed attributes of the image. The retrieved modification is then applied to the image based on the attributes of the image.

Figure 1A:
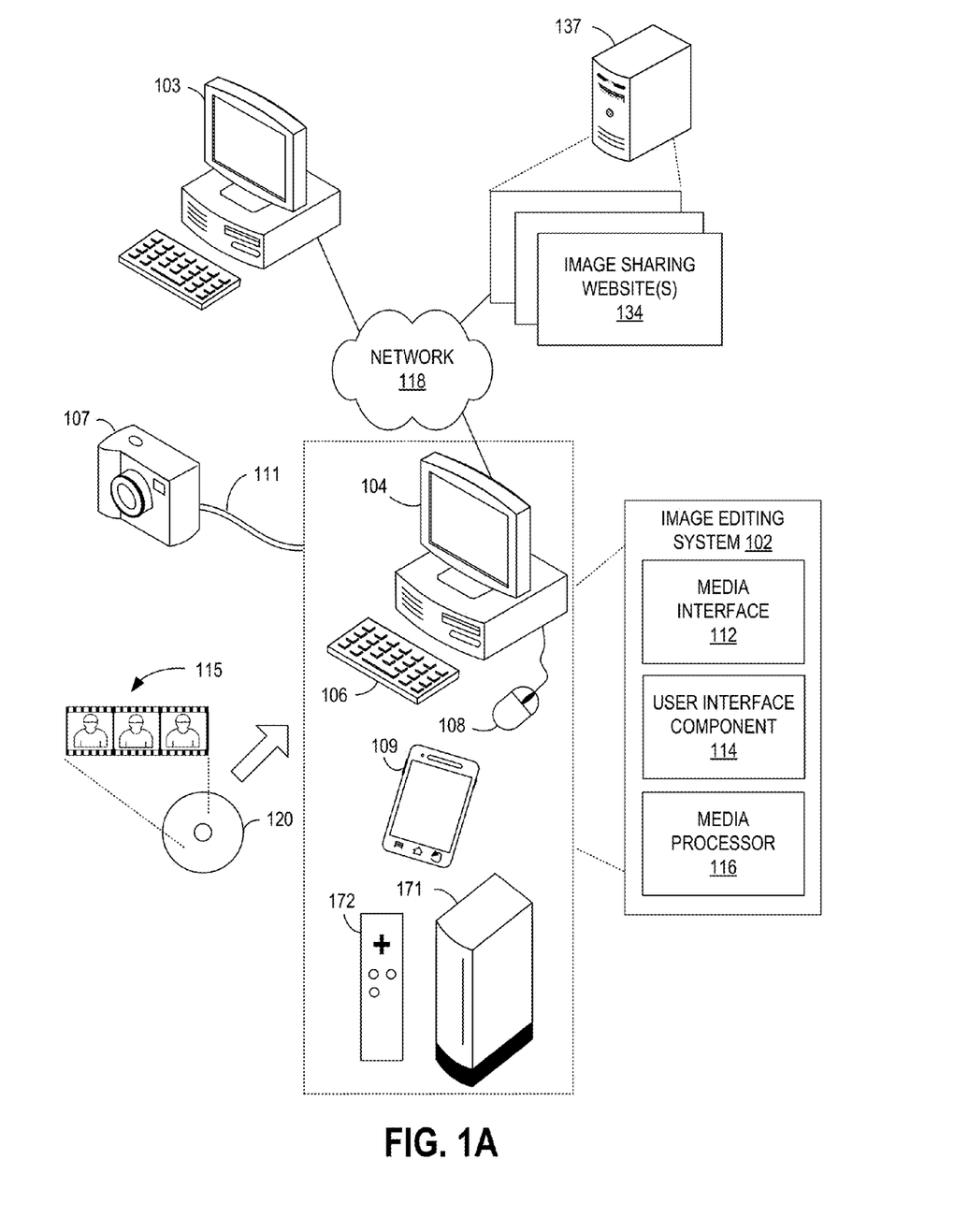
FIG. 1A is a block diagram of an image editing system for facilitating automatic image editing in accordance with various embodiments of the present disclosure.

A description of a system for facilitating automatic image editing through the retrieval of one or more image modifications is now described followed by a discussion of the operation of the components within the system. FIG. 1A is a block diagram of an image editing system 102 in which embodiments of the automatic image editing techniques disclosed herein may be implemented. The image editing system 102 may be embodied, for example, as a desktop computer, computer workstation, laptop, a smartphone 109, a tablet, or other computing platform that includes a display 104 and may include such input devices as a keyboard 106 and a mouse 108.

For embodiments where the image editing system 102 is embodied as a smartphone 109 or tablet, the user may interface with the image editing system 102 via a touch-screen interface (not shown). In other embodiments, the image editing system 102 may be embodied as a video gaming console 171, which includes a video game controller 172 for receiving user preferences. For such embodiments, the video gaming console 171 may be connected to a television (not shown) or other display 104.

The image editing system 102 is configured to retrieve, via the media interface 112, digital media content 115 stored on a storage medium 120 such as, by way of example and without limitation, a compact disc (CD) or a universal serial bus (USB) flash drive, wherein the digital media content 115 may then be stored locally on a hard drive of the image editing system 102. As one of ordinary skill will appreciate, the digital media content 115 may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats.

As depicted in FIG. 1A, the media interface 112 in the image editing system 102 may also be configured to retrieve digital media content 115 directly from a digital camera 107 where a cable 111 or some other interface may be used for coupling the digital camera 107 to the image editing system 102. The image editing system 102 may support any one of a number of common computer interfaces, such as, but not limited to IEEE-1394 High Performance Serial Bus (Firewire), USB, a serial connection, and a parallel connection.

The digital camera 107 may also be coupled to the image editing system 102 over a wireless connection or other communication path. The image editing system 102 may be coupled to a network 118 such as, for example, the Internet, intranets, extranets, wide area networks (WANs), local area networks (LANs), wired networks, wireless networks, or other suitable networks, etc., or any combination of two or more such networks. Through the network 118, the image editing system 102 may receive digital media content 115 from another computing system 103. Alternatively, the image editing system 102 may access one or more image sharing websites 134 hosted on a server 137 via the network 118 to retrieve digital media content 115.

The user interface component 114 in the image editing system 102 is configured to generate a user interface for obtaining one or more modifications from a user for editing an image. The one or more modifications obtained from a user of the image editing system 102 may be stored in a training database and later retrieved by the image editing system 102 and applied to new images obtained by the media interface 112. For purposes of this disclosure, the "training" database is utilized by the image editing system 102 to adaptively recommend and/or apply modifications for new, incoming images. The training database facilitates this process by storing previously-applied modifications that may later be recommended and/or applied to new images. Each modification is associated with a name or other identifier of an individual.

Figure 1B:
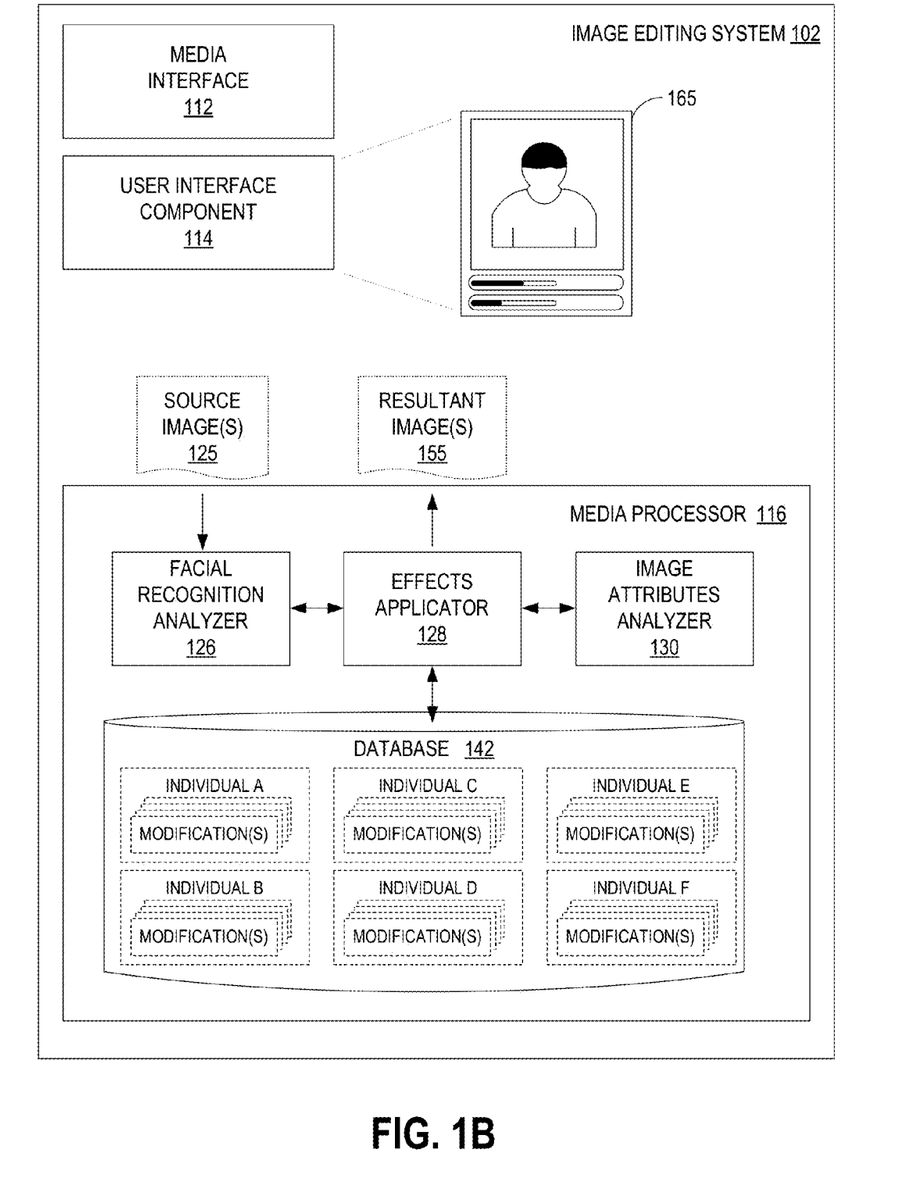
FIG. 1B illustrates various components of the media processor in the image editing system of FIG. 1A in accordance with various embodiments of the present disclosure.

The media processor 116 is configured to analyze the attributes of newly acquired images and retrieve one or more modifications based on the attributes of the new acquired images. The media processor 116 is further configured to determine whether to apply the retrieved modification(s) to the newly acquired images. Reference is made to FIG. 1B, which illustrates various components of the media processor 116 in FIG. 1A. As shown, the media processor 116 further comprises a facial recognition analyzer 126, an effects applicator 128, an image attributes analyzer 130, and a database 142.

The facial recognition analyzer 126 in the media processor 116 is configured to receive a source image 125 obtained by the media interface 112 and determine whether the source image 125 includes one or more individuals. For some embodiments, the facial recognition analyzer 126 separates source images 125 of individuals from source images 125 that do not depict individuals such as images of objects, scenery, etc. The facial recognition analyzer 126 is further configured to identify the individuals in the source images 125. For example, the facial recognition analyzer 126 may determine that a new source image 125 includes a picture of "John" or "Laura."

The effects applicator 128 is configured to retrieve modifications from a training database 142 based on the one or more individuals identified by the facial recognition analyzer 126. For various embodiments, the data stored in the training database 142 may include one or more profiles of individuals, where each profile includes the name of an individual and one or more modifications previously applied to source images 125 of that individual. Each profile may include other information including a history of modifications applied to source images 125 of an individual. Each profile may also include data reflecting when each modification was applied and the number of instances in which each modification was previously applied.

For example, the training database 142 may include two past modifications for "John" where one modification comprises a particular hue saturation level that was previously set while another modification may comprise a particular brightness level. In this regard, the effects applicator 128 may retrieve one or more modifications associated with an individual based various criteria. For example, the effects applicator 128 may retrieve a most recently applied modification, the most commonly applied modification, the most popular modification across the different profiles, and so on. For some embodiments, the selection criteria applied by the effects applicator 128 for retrieving a previously-stored modification may be specified by the user. The user may configure the effects applicator 128 to retrieve, for example, the most commonly applied modification.

The image attributes analyzer 130 is configured to analyze newly acquired source images 125 of individuals and determine whether to apply a retrieved modification based on the current attributes of the newly acquired source image 125. Suppose, for example, that the effects applicator 128 is configured to retrieved the most commonly applied modification for "John" and that the modification comprises a target hue saturation level of the image. The image attributes analyzer 130 analyzes the current hue saturation level of the newly acquired source image 125 and sends a control signal to the effects applicator 128 notifying the effects applicator 128 whether it is necessary to apply the modification in view of the current attributes of the newly acquired source image 125.

If the hue saturation level of the newly acquired source image 125 substantially matches the target hue saturation level, the image attributes analyzer 130 generates a control signal that notifies the effects applicator 128 that no further modification is needed as the newly acquired image 125 already meets the target modification. Based on the control signal received by the effects applicator 128 from the image attributes analyzer 130, the effects applicator 128 outputs a resultant image 155 that applies the retrieved modification associated with the individual in the source image 125.

Figure 2:
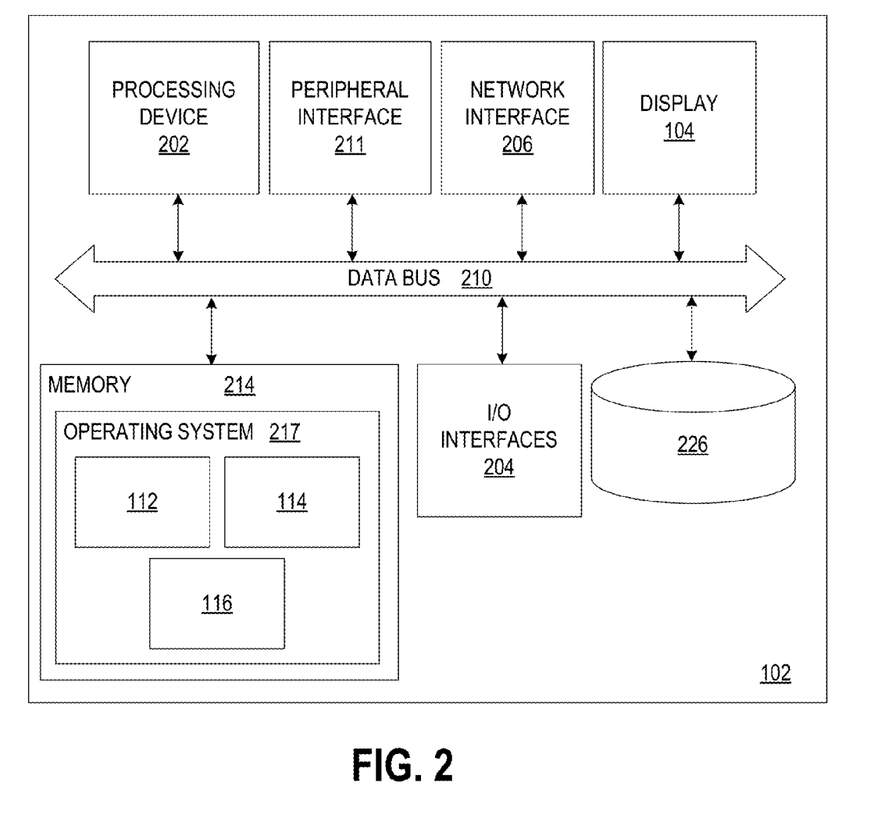
FIG. 2 is a detailed view of the image editing system device of FIG. 1A in accordance with various embodiments of the present disclosure.

FIG. 2 is a schematic diagram of the image editing system 102 shown in FIG. 1A. The image editing system 102 may be embodied in any one of a wide variety of wired and/or wireless computing devices, such as a desktop computer, portable computer, dedicated server computer, multiprocessor computing device, smartphone 109 (FIG. 1A), tablet computing device, and so forth. As shown in FIG. 2, the image editing system 102 comprises memory 214, a processing device 202, a number of input/output interfaces 204, a network interface 206, a display 104, a peripheral interface 211, and mass storage 226, wherein each of these devices are connected across a local data bus 210.

The processing device 202 may include any custom made or commercially available processor, a central processing unit (CPU) or an auxiliary processor among several processors associated with the image editing system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 217, one or more native applications, emulation systems, or emulated applications for any of a variety of operating systems and/or emulated hardware platforms, emulated operating systems, etc.

The applications may include application specific software which may comprise some or all the components (media interface 112, user interface component 114, media processor 116) of the image editing system 102 depicted in FIG. 1A. In accordance with such embodiments, the components are stored in memory 214 and executed by the processing device 202. One of ordinary skill in the art will appreciate that the memory 214 can, and typically will, comprise other components which have been omitted for purposes of brevity.

In this regard, the term "executable" may refer to a program file that is in a form that can ultimately be run by the processing device 202. Examples of executable programs may be, for example, a compiled program that can be translated into machine code in a format that can be loaded into a random access portion of the memory 214 and run by the processing device 202, source code that may be expressed in proper format such as object code that is capable of being loaded into a random access portion of the memory 214 and executed by the processing device 202, or source code that may be interpreted by another executable program to generate instructions in a random access portion of the memory 214 to be executed by the processing device 202, etc. An executable program may be stored in any portion or component of the memory 214 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Input/output interfaces 204 provide any number of interfaces for the input and output of data. For example, where the image editing system 102 comprises a personal computer, these components may interface with one or more user input devices via the I/O interfaces 204, where the user input devices may comprise a keyboard 106 (FIG. 1A) or a mouse 108 (FIG. 1A). The display 104 may comprise a computer monitor, a plasma screen for a PC, a liquid crystal display (LCD), a touchscreen display, or other display device 104.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, network interface 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The image editing system 102 may communicate with one or more computing devices via the network interface 206 over the network 118 (FIG. 1A). The image editing system 102 may further comprise mass storage 226. The peripheral interface 211 supports various interfaces including, but not limited to IEEE-1294 High Performance Serial Bus (Firewire), USB, a serial connection, and a parallel connection.

Figure 3:
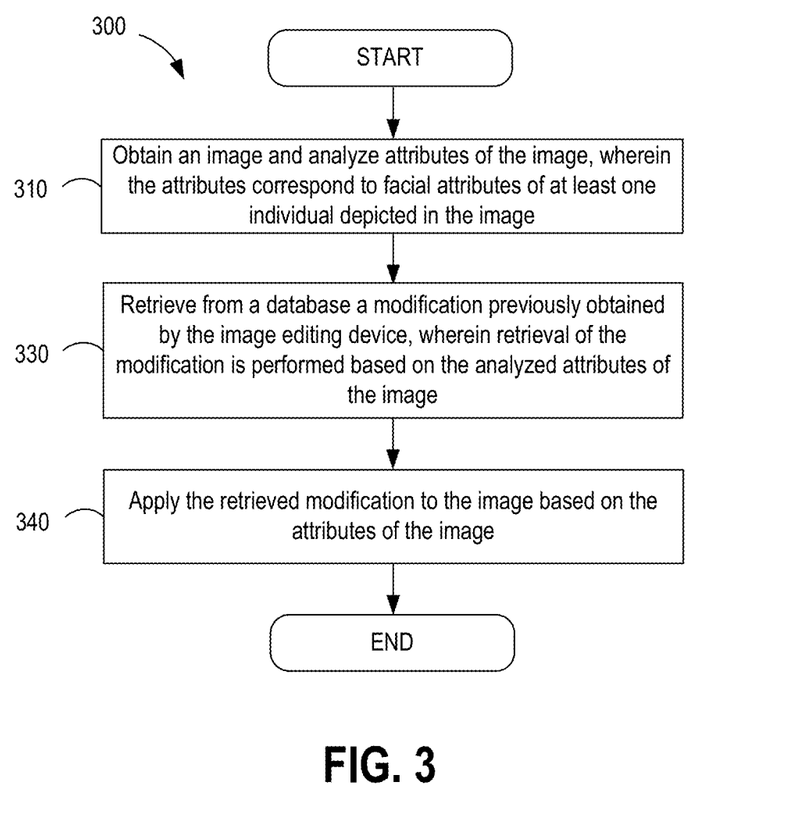
FIG. 3 is a top-level flowchart illustrating examples of functionality implemented as portions of the image editing device of FIG. 1 for facilitating automatic image editing according to various embodiments of the present disclosure.

Reference is made to FIG. 3, which is a flowchart 300 in accordance with one embodiment for facilitating automatic image editing performed by the image editing system 102 of FIG. 1A. It is understood that the flowchart 300 of FIG. 3 provides merely an example of the many different types of functional arrangements that may be employed to implement the operation of the various components of the image editing system 102 (FIG. 1A). As an alternative, the flowchart of FIG. 3 may be viewed as depicting an example of steps of a method implemented in the image editing system 102 according to one or more embodiments.

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

Beginning with block 310, a source image 125 (FIG. 1B) to be edited is obtained by the media interface 112 (FIG. 1A), and the facial recognition analyzer 126 (FIG. 1B) in the media processor 116 (FIG. 1A) analyzes attributes of the source image 125. This may comprise, for example, determining whether the source image 125 includes one or more individuals. The analysis may also include identification of the one or more individuals depicted in the source image 125. The facial recognition analyzer 126 may also be configured to analyze the background portion of the source image 125.

In block 320, the effects applicator 128 (FIG. 1B) retrieves a modification from a database 142 (FIG. 1B) where the modification was previously obtained by the image editing device 102. For some embodiments, retrieval of the modification is performed based on the analyzed attributes of the image. For example, the effects applicator 128 may be configured to retrieve a particular modification among previously-stored modifications made to images depicting a particular individual (e.g., "John") based on a determination by the facial recognition analyzer 126 that the obtained source image 125 depicts "John." As described above, the effects applicator 128 may, for example, retrieve a most recently applied modification, the most commonly applied modification, the most popular modification across the different profiles, and so on, where the selection criteria may be user-specified.

In block 330, the effects applicator 128 applies the retrieved modification to the source image 125 based on the attributes of the image. In particular, the image attributes analyzer 130 (FIG. 1B) may analyze the source image 125 based on the retrieved modification to determine whether additional modification to the source image 125 is needed. If the image attributes analyzer 130 determines that the source image 125 already substantially aligns with the modification, the image attributes analyzer 130 notifies the effects applicator 128 that no modification is needed.

For example, if the attributes analyzer 130 determines that the current hue saturation level of the source image 125 already substantially matches the hue saturation level specified in the retrieved modification previously applied to other images, then no modification is needed. On the other hand, if the image attributes analyzer 130 determines that the source mage 125 does not align with the modification, the image attributes analyzer 130 notifies the effects applicator 128, which then applies the retrieved modification.

Figure 4:
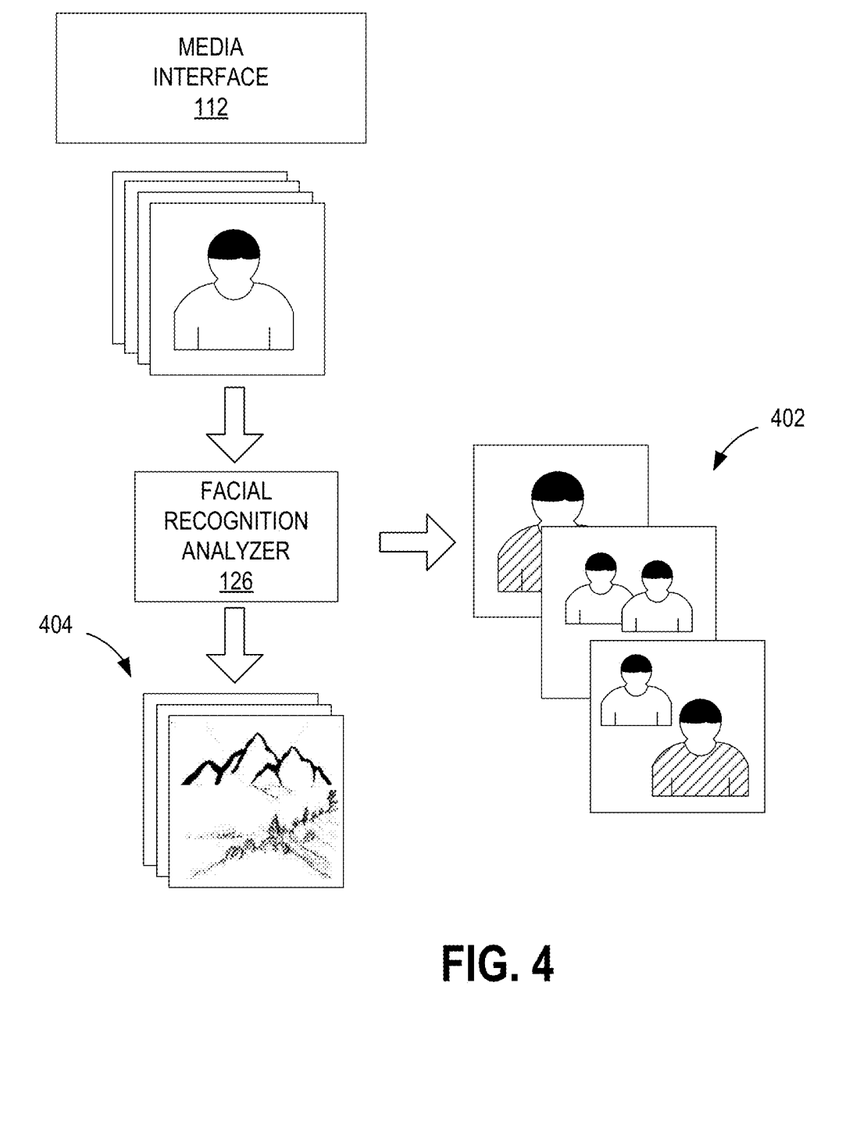
Figure 5:
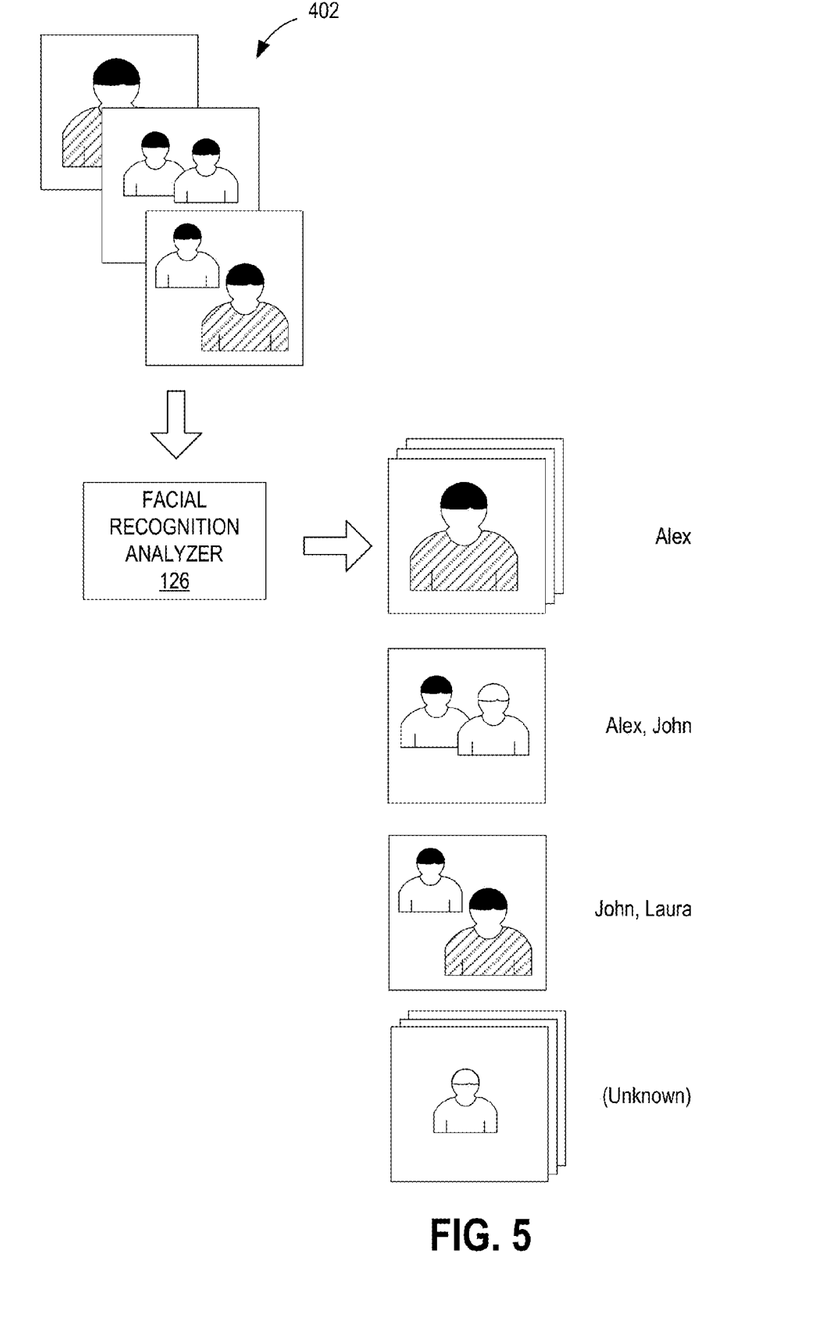
Figure 6A:
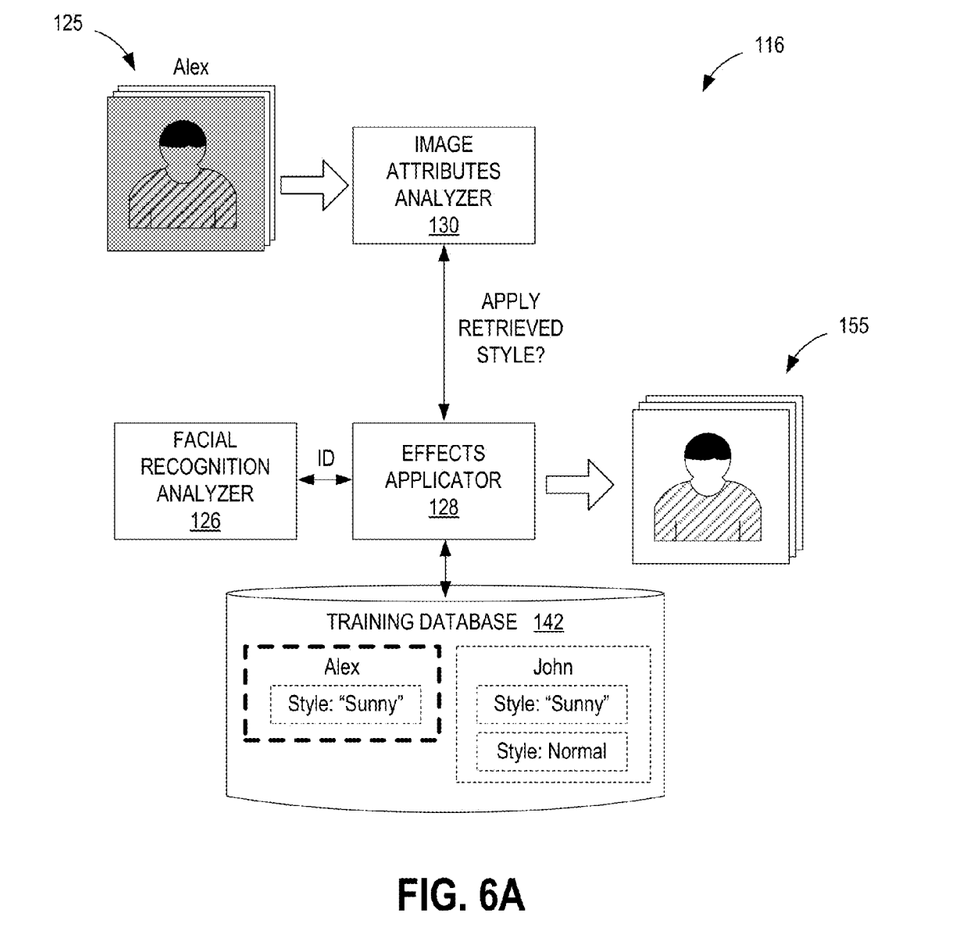
Figure 6B:
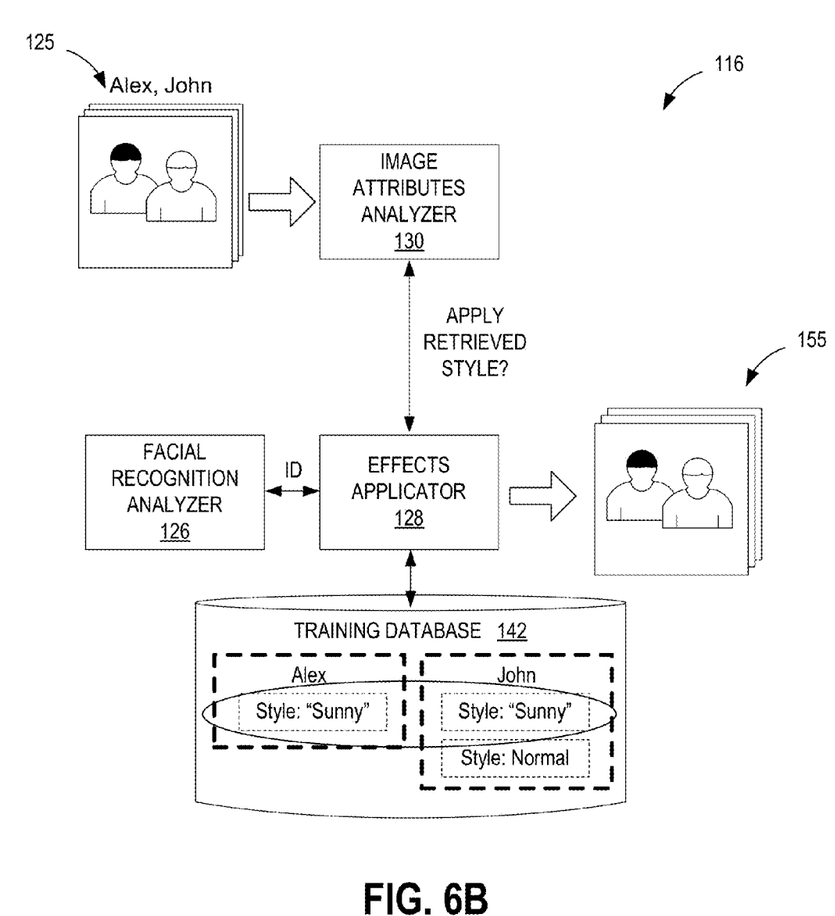

To further illustrate the automatic image editing techniques disclosed, reference is made to FIGS. 4-6, which illustrates the operation of the various components of the image editing system 102. With reference to FIG. 4, automatic image editing process beings with the media interface 112 obtaining a source image 125 to undergo image editing in accordance with various embodiments. As discussed earlier, the media interface 112 may retrieve the source image 125 from various sources including a digital camera 107 (FIG. 1A), one or more image sharing websites 134 (FIG. 1A) hosted on a server 137 (FIG. 1A), and so on.

The source image 125 is forwarded to the facial recognition analyzer 126, which performs facial recognition analysis to determine whether the source image 125 depicts one or more individuals. For some embodiments, the facial recognition analyzer 126 categorizes incoming source images 125 according to images that depict individuals and images that do not depict individuals (such as images of objects, scenery, etc.) As shown, the facial recognition analyzer 126 generates two clusters 402, 404 of images based on the facial recognition analysis.

FIG. 5 illustrates further processing performed by the facial recognition analyzer 126. Upon generating a cluster 402 of source images 125 depicting individuals, the facial recognition analyzer 126 further processes the cluster 402 to identify the individuals depicted in the source images 125 where identification of individuals in the source images 125 may be based, for example, on previously-tagged images stored in the image editing system 102 (FIG. 1A). In the example shown, the facial recognition analyzer 126 identifies the individuals in images depicting one or more individuals.

As shown, the facial recognition analyzer 126 also generates a cluster of source images 125 in which the individuals depicted in the images are unknown. For example, if "John" and "Alex" are both identified in an image, the effects applicator 128 accesses the training database 142 to retrieve two modifications corresponding to the individuals "John" and "Alex." A user interface may then be presented to the user prompting the user to select a modification corresponding to "John" and/or a modification corresponding to "Alex." In this regard, the user may elect to apply a single modification or a combination of modifications to the source images 125. In other embodiments, the system may automatically apply retrieved modifications corresponding to both "John" and "Alex" depicted in the images.

Turning now to FIG. 6A, the media processor 116 then processes each cluster of source images 125 depicting identified individuals. In the example shown, a cluster of source images 125 depicting "Alex" is processed. The facial recognition analyzer 126 forwards information relating to the identified individual to the effects applicator 128 where the information may comprise, for example, a tag or string that identifies a particular individual. Based on this information, the effects applicator 128 accesses the database 142 to retrieve one or more modifications previously applied to other images depicting the same individual. In the example shown in FIG. 6A, the effects applicator 128 retrieves one or more modifications previously applied to images depicting "Alex."

The training database 142 stores the profiles of various individuals (e.g., "Alex" and "John"), where each profile includes the name of an individual and one or more modifications previously applied to source images 125 of that individual. As shown, the database 142 includes one prior modification previously applied to other images depicting Alex. For some embodiments, the modifications may be embodied as styles with a corresponding descriptor such as, for example, "Sunny" or "Normal" where the labels characterize the overall effect achieved by the modification. The style "Sunny," for example, may correspond to a higher brightness level and/or higher contrast level. Note that each modification or style is not limited to a single setting change (e.g., color level versus contrast level of the image) and instead, may comprise a combination of multiple setting changes (e.g., a target gamma setting and a target contrast setting). For some embodiments, when a modification is applied to an image, the image editing system 102 may be configured to obtain a style descriptor from the user (e.g., "Sunny") or apply a default modification. The style descriptor is then stored in the training database 142. Note also that each modification stored in the training database 142 may generally be categorized as one of two main types: modifications to individuals and modifications to the background. As described in more detail below, users may select or specify that a modification be applied only to the individual(s) depicted in the image, only the background portion of an image, or to the entire image.

In some instances, a particular profile may be associated with multiple styles or modifications that were previously applied to images depicting the individual. For example, as shown, the profile for "John" includes two modifications previously applied to images depicting "John." For such instances, the effects applicator 128 notifies the user interface component 114 (FIG. 1A), which generates a user interface prompting the user to select one of the retrieved modifications. For some embodiments, the effects applicator 128 may be configured to automatically select one of the modifications based on such criteria as the most recently applied modification, the most commonly applied modification for that individual, the most commonly applied modification across all individuals, and so on where the user of the image editing system 102 may specify the criteria to be applied. In the example shown in FIG. 6A, the effects applicator 128 applies the modification retrieved from the training database 142 to the source image 125 to derive the resultant image 155.

Figure 7A:
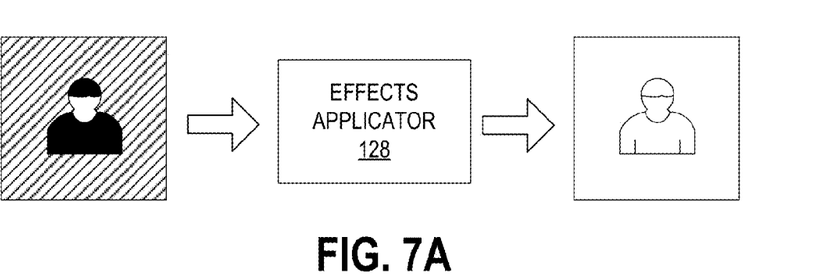
FIGS. 7A, 7B, and 7C illustrate selective application of a retrieved modification by the image editing system of FIG. 1A in accordance with various embodiments of the present disclosure.
Figure 7B:
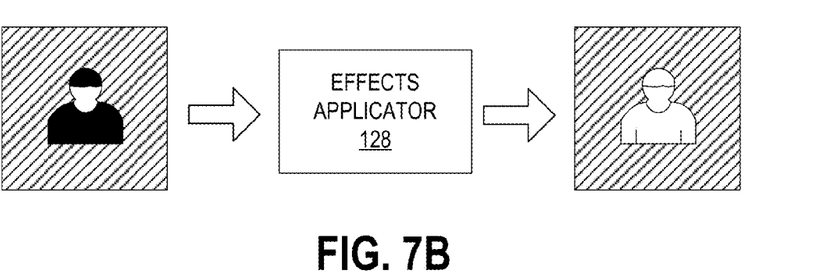
Figure 7C:
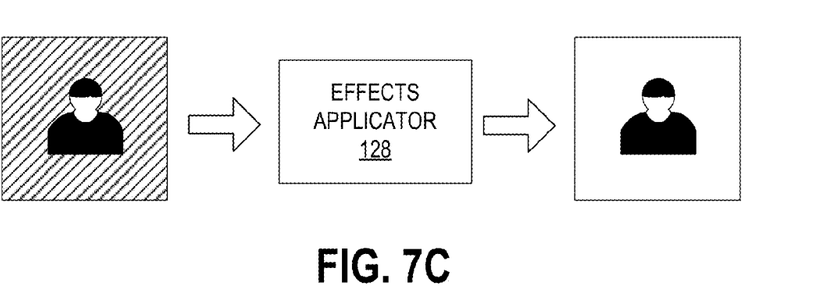

Note that in accordance with various embodiments, the effects applicator 128 may be configured to apply the retrieved modification to only the individual(s) depicted in the image and not to the entire image. To illustrate, reference is made to FIGS. 7A, 7B, and 7C, which illustrate selective application of a retrieved modification. FIG. 7A illustrates an implementation whereby the effect applicator 128 applies a retrieved modification to the entire image where both the individual depicted in the image and the background portion of the image are modified. FIG. 7B illustrates an implementation whereby the effects applicator 128 selectively applies the retrieved modification only to the individual depicted in the image. Note that while only a single individual is depicted in the examples provided, the selective application of a retrieved modification may be applied to images depicting multiple individuals as well. FIG. 7C illustrates an implementation whereby the effects applicator 128 selectively applies the retrieved modification only to the background portion of the image. In some cases, for example, a user may wish to simply blackout the background portion of images depicting a particular individual.

For some embodiments, the selection criteria applied in retrieving a previously-applied modification from the training database 142 may be based on a single criteria or a combination of various criteria, where the selection criteria may comprise the most recently applied modification, the most commonly applied modification for that individual, the most commonly applied modification across all individuals, and so on. For some embodiments, the combination of various criteria applied in retrieving or recommending a modification is based on a weighted combination to derive a modification value based on previously-applied modifications for a particular individual, where the modification value is used to facilitate the retrieval of a modification to be applied to an incoming photo. As an example, a higher weighting may be assigned to the parameter reflecting the date/time in which a particular modification was last applied. Based on the modification value, a recommended modification may be displayed via a user interface, where a user may then elect whether to apply the recommended modification.

For some embodiments, profile data corresponding to an individual may be embodied as a table of previously-applied modifications stored in the training database 142. Below is an example of a modification table generated for Individual A that stores various parameters associated with previously-applied modifications. The table also shows which modification is selected and recommended to the user. For example, the table shows that the "Sunny" style modification has been previously applied three times, while the "Magazine" style has been previously applied twice. Based on this, a dialog box may be presented to the user where the dialog box recommends the "Sunny" modification for a new, incoming photo.

| Individual A | Modification 1: "Sunny" style | Modification 2: "Magazine" style | Recommended Modification |
|---|---|---|---|
| No. of instances | 3 selections | 2 selections | Modification 1 |
| Last application | 2 month ago | 3 days ago | Modification 2 |
| Color tone value | +3 | +5 | +4 (avg. value) |
| Contrast level | +7 | +5 | +6 (avg. value) |
| Gamma level | +40 | −20 | +10 (avg. value) |
| Brightness level | +10 | +5 | +7.5 (avg. value) |

In this regard, the selected modification may be based on any of a number of parameters or combination of parameters. For example, in the table above, the recommended color tone value may be based on an average of previously-applied color tone levels applied to other photos. A table is generated and updated for each individual and stored in the training database 142.

Upon retrieving and determining which modification to apply (where multiple modifications for a particular individual are found in the database 142), the effects applicator 128 notifies the image attributes analyzer 130 of the target modification. Responsive to the notification from the effects applicator 128, the image attributes analyzer 130 analyzes the attributes of the source image 125 to determine whether the source image 125 already meets the target modification. Such attributes may include, for example and without limitation, the color level of the source image 125, the contrast level, the gamma level, the brightness level, and the hue saturation level.

For some embodiments, the image attributes analyzer 130 may determine whether the relevant attributes of the source image 125 fall within a predetermined range of the one or more target attributes specified by the modification. Suppose, for example, that the retrieved modification specifies a minimum brightness level of 45. The image attributes analyzer 130 analyzes the current brightness level of the source image 125 to determine whether the brightness level is greater than or equal to 45. If the current brightness level of the source image 125 already exceeds the target brightness level, the image attributes analyzer 130 notifies the effects applicator 128 that no further modification is needed. However, if the current brightness level of the source image is less than 45, the image attributes analyzer 130 notifies the effects applicator 128 to apply the retrieved modification, thereby generating a resultant image.

Upon application of the retrieved modification, the effects applicator 128 updates the profile data associated with the individual (e.g. "John") to reflect that the modification was once again applied. In this regard, embodiments of the image editing system 102 provides an automatic image editing process that learns the editing preferences of the user on an individual-by-individual basis.

Reference is made to FIG. 6B, which illustrates an example where a source image 126 includes multiple individuals. In the example shown, the source image 125 includes depictions of both "Alex" and "John." In such instances, the effects applicator 128 may notify the user interface component 114 upon receiving identification information of multiple individuals from the facial recognition analyzer 126. The user interface component 114 may then generate a user interface that presents a dialog box, for example, prompting the user to select which individual the user wishes to focus on. Based on the selection obtained from the user, the effects applicator 128 accesses the corresponding profile in the database 142 and retrieves a modification to be applied to the source image 125.

For some embodiments, retrieval of the modification may be performed automatically by the effects applicator 128. For some implementations, the effects applicator 128 is configured to determine whether a common modification exists between the multiple individuals. As shown in FIG. 6B, previously-stored images of "Alex" and "John" share a common modification ("Sunny" style), where the style corresponds, for example, to a particular hue saturation level or contrast level. Based on the existence of a commonly-applied modification, the effects applicator 128 may be configured to retrieve this particular modification.

Figure 8:
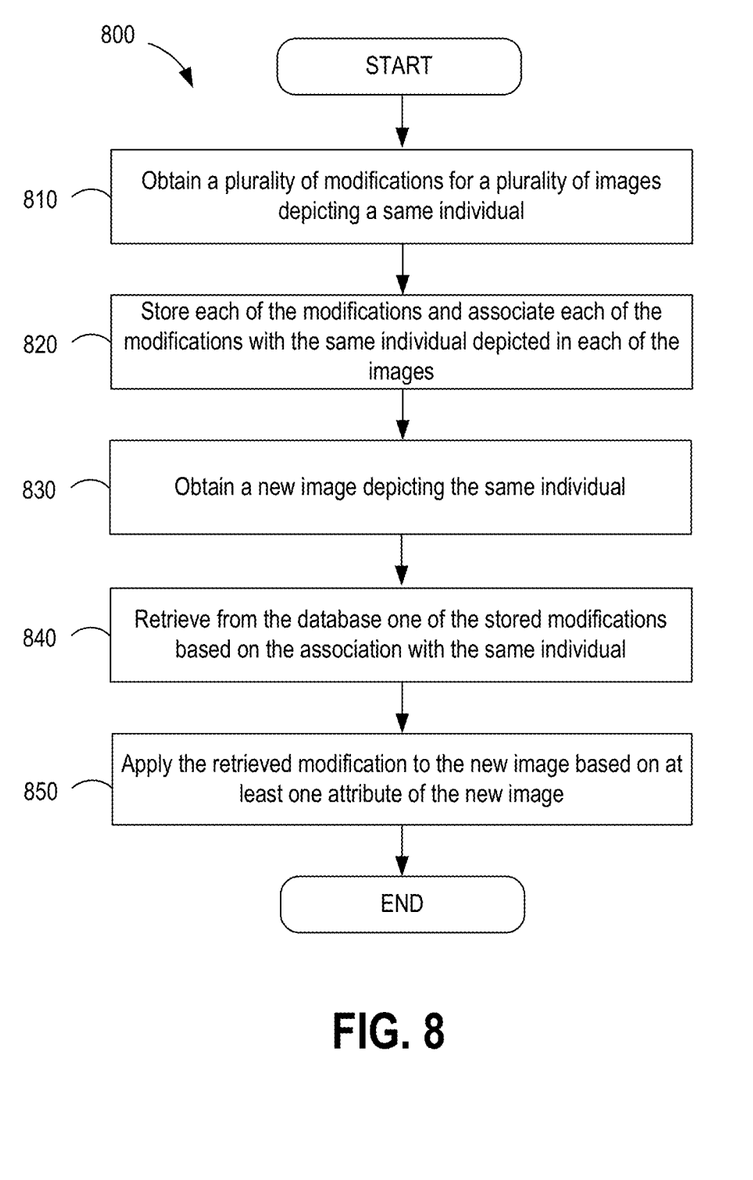
FIG. 8 is a flowchart in accordance with an alternative embodiment for facilitating automatic image editing performed by the image editing system 102 of FIG. 1A.

Reference is made to FIG. 8, which is a flowchart 800 in accordance with an alternative embodiment for facilitating automatic image editing performed by the image editing system 102 of FIG. 1A. It is understood that the flowchart 800 of FIG. 8 provides merely an example of the many different types of functional arrangements that may be employed to implement the operation of the various components of the image editing system 102 (FIG. 1A). As an alternative, the flowchart of FIG. 8 may be viewed as depicting an example of steps of a method implemented in the image editing system 102 according to one or more embodiments.

Although the flowchart of FIG. 8 shows a specific order of execution, it is understood that the order of execution may differ from that which is depicted. For example, the order of execution of two or more blocks may be scrambled relative to the order shown. Also, two or more blocks shown in succession in FIG. 8 may be executed concurrently or with partial concurrence. It is understood that all such variations are within the scope of the present disclosure.

Beginning with block 810, the image editing system 102 obtains a plurality of modifications for a plurality of images depicting a same individual. In block 820, the image editing system 102 stores each of the modifications in the training database 142 (FIG. 6A) and associates each of the modifications with the same individual depicted in each of the images. In block 830, the media interface 112 (FIG. 1A) obtains a new source image 125 (FIG. 1B).

In block 840, the effects applicator 128 (FIG. 1B) retrieves from the training database 142 one of the stored modifications based on the association with the same individual. For some embodiments, retrieval of the modification is performed based on analyzed attributes of the image. For example, the effects applicator 128 may be configured to retrieve a particular modification among previously-stored modifications made to images depicting a particular individual (e.g., "John") based on a determination by the facial recognition analyzer 126 that the obtained source image 125 depicts "John." As described above, the effects applicator 128 may, for example, retrieve a most recently applied modification, the most commonly applied modification, the most popular modification across the different profiles, and so on, where the selection criteria may be user-specified.

In block 850, the effects applicator 128 applies the retrieved modification to the source image 125 based on the attributes of the image. In particular, the image attributes analyzer 130 (FIG. 1B) may analyze the source image 125 based on the retrieved modification to determine whether additional modification to the source image 125 is needed. If the image attributes analyzer 130 determines that the source image 125 already substantially aligns with the modification, the image attributes analyzer 130 notifies the effects applicator 128 that no modification is needed.

For example, if the attributes analyzer 130 determines that the current hue saturation level of the source image 125 already substantially matches the hue saturation level specified in the retrieved modification previously applied to other images, then no modification is needed. On the other hand, if the image attributes analyzer 130 determines that the source mage 125 does not align with the modification, the image attributes analyzer 130 notifies the effects applicator 128, which then applies the retrieved modification.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method for editing an image in an image editing device, comprising:
   obtaining the image and analyzing attributes of the image, wherein the attributes correspond to facial attributes of at least one individual shown in the image;
   retrieving from a database a recommended modification according to a weighted combination of a plurality of selection criteria, wherein data relating to the selection criteria is stored in an application history associated with the at least one individual, wherein the selection criteria comprises each of: a most commonly applied modification for the at least one individual and a most commonly applied modification across all individuals;
   obtaining user input on whether to utilize the recommended modification;
   applying the recommended modification to the image based on the user input and based on the attributes of the image; and
   updating the application history of the recommended modification in the database.

2. The method of claim 1, wherein analyzing attributes of the image further comprises comparing the attributes of the obtained image with the modification in the database.

3. The method of claim 1, wherein each modification in the database comprises one of a corresponding style descriptor specified by a user or a default modification.

4. The method of claim 1, wherein the modification comprises at least one of:
   a target color level of the image,
   a target contrast level of the image,
   a target gamma level of the image, a target brightness level of the image, and
a target hue, saturation, lightness level of the image.

5. The method of claim 1, wherein the modification comprises at least one of:
red eye removal,
wrinkle removal,
skin tone adjustment,
a skin smoothing effect,
a sharpness level adjustment, and
noise removal of the image.

6. The method of claim 1, wherein the attributes further comprise at least one of:
a color level of the image,
a contrast level of the image,
a gamma level of the image,
a brightness level of the image, and
a hue, saturation, lightness level of the image.

7. The method of claim 1, wherein the attributes correspond to metadata associated with the image, wherein the metadata comprises at least one of:
a time stamp of the image,
a date stamp of the image,
Global Positioning System (GPS) data of the image, and
a camera type associated with the image.

8. The method of claim 2, wherein applying the retrieved modification to the image based on the attributes of the image comprises applying the retrieved modification to the image only if at least a portion of the attributes does not approximately coincide with the modification.

9. The method of claim 1, further comprising identifying the at least one individual shown in the obtained image.

10. The method of claim 9, wherein the retrieved modification corresponds to the same at least one individual.

11. The method of claim 10, wherein the retrieved modification corresponding to the individual is applied only to the identified individual depicted in the obtained image and not to a background portion of the obtained image.

12. The method of claim 9, wherein applying the retrieved modification to the image based on the attributes of the image comprises one of:
applying the modification only to the identified individual depicted in the obtained image and not to a background portion of the obtained image; or
applying the modification to the entire obtained image.

13. The method of claim 10, further comprising:
in response to multiple individuals being depicted in the obtained image, displaying a dialog box on a user interface prompting a user to select at least one modification to be applied, wherein the at least one modification corresponds to the multiple individuals.

14. The method of claim 1, wherein data relating to the selection criteria comprises a count value stored in the application history indicating a number of instances in which the modification has been previously applied.

15. The method of claim 1, wherein obtaining the image and analyzing attributes of the image further comprises analyzing a background of the image.

16. The method of claim 15, further comprising:
obtaining a style descriptor from the user; and
applying the style descriptor to the background of the image or to the at least one individual shown in the obtained image.

17. A system for editing images, comprising:
a memory storing instructions; and
a processor coupled to the memory and configured by the instructions to at least:
obtain an image;
analyze whether the image comprises an individual and identify the individual in the image;
retrieve a recommended modification according to a weighted combination of a plurality of selection criteria, wherein data relating to the selection criteria is stored in an application history associated with the individual, wherein the selection criteria comprises each of: a most commonly applied modification for the at least one individual and a most commonly applied modification across all individuals;
obtain user input on whether to utilize the recommended modification; and
apply the recommended modification to the image based on the user input and based on attributes of the image; and
update the application history of the recommended modification in the database.

18. The system of claim 17, wherein the attributes correspond to at least one of:
a color level of the image,
a contrast level of the image,
a gamma level of the image,
a brightness level of the image, and
a hue, saturation, lightness level of the image.

19. The system of claim 18, wherein the modification comprises at least one of:
a target color level of the image,
a target contrast level of the image,
a target gamma level of the image,
a target brightness level of the image, and
a target hue, saturation, lightness level of the image.

20. The system of claim 19, wherein the processor is configured to make a determination not to apply the retrieved modification to the image if at least a portion of the attributes approximately coincides with the modification.

21. The system of claim 17, further comprising a user interface component configured to obtain a style descriptor from the user for the selected modification.

22. A non-transitory computer-readable medium embodying a program executable in a computing device, comprising:
code that obtains an image and identifies an individual in the image;
code that retrieves a recommended modification previously obtained from a database, wherein the code that retrieves is configured to retrieve the recommended modification according to a weighted combination of a plurality of selection criteria, wherein data relating to the selection criteria is stored in an application history associated with the individual, wherein the selection criteria comprises each of: a most commonly applied modification for the at least one individual and a most commonly applied modification across all individuals;
code that obtains user input on whether to utilize the recommended modification;
code that applies the retrieved modification based on user input and based on based on attributes of the image; and
code that updates the application history of the recommended modification in the database.

23. The non-transitory computer-readable medium of claim 22, wherein the previously obtained modification was previously applied to at least one other image depicting the same individual.

24. The non-transitory computer-readable medium of claim 22,
wherein the attributes correspond to at least one of:
a color level of the image, a contrast level of the image,
a gamma level of the image,
a brightness level of the image, and
a hue, saturation, lightness level of the image.

25. The non-transitory computer-readable medium of claim 22,
wherein the modification comprises at least one of:
a target color level of the image,
a target contrast level of the image,
a target gamma level of the image,
a target brightness level of the image, and
a target hue, saturation, lightness level of the image.

26. The non-transitory computer-readable medium of claim 22,
wherein the code that applies the retrieved modification applies the modification only to the identified individual depicted in the obtained image or only to a background portion of the image.

27. The non-transitory computer-readable medium of claim 22, further comprising code that obtains a style descriptor from a user upon application of the retrieved modification and stores the style descriptor in the database.

28. A method for editing an image in an image editing device, comprising:
obtaining a plurality of modifications for a plurality of images depicting a same individual;
storing each of the modifications and associating each of the modifications with the same individual depicted in each of the images;
obtaining a new image depicting the same individual;
retrieving from the database a recommended modification among the plurality of modifications according to a weighted combination of a plurality of selection criteria, wherein data relating to the selection criteria is stored in an application history associated with the individual, wherein the selection criteria comprises each of: a most commonly applied modification for the at least one individual and a most commonly applied modification across all individuals; and
applying the retrieved modification to the new image based on at least one attribute of the new image.

29. The method of claim 28, wherein data relating to the selection criteria comprises a count value stored in the application history indicating a number of instances in which the modification has been previously applied.

30. The method of claim 28, wherein the retrieved modification is applied to the new image only if the at least one attribute does not substantially coincide with the retrieved modification.

* * * * *